United States Patent [19]
DeShong

[11] Patent Number: 5,021,617
[45] Date of Patent: Jun. 4, 1991

[54] MOTOR VEHICLE TURN SIGNAL CANCELLING DEVICE

[75] Inventor: Michael H. DeShong, Lexington, Ind.

[73] Assignee: The Grote Manufacturing Co., Madison, Ind.

[21] Appl. No.: 488,127

[22] Filed: Mar. 5, 1990

[51] Int. Cl.$^5$ ............................................. H01H 3/16
[52] U.S. Cl. ............................... 200/61.27; 200/61.3; 200/61.34; 200/61.35
[58] Field of Search .................. 200/61.27, 61.3, 61.31, 200/61.32, 61.33, 61.34, 61.35, 61.36, 61.54

[56] References Cited

U.S. PATENT DOCUMENTS

| | | | |
|---|---|---|---|
| 2,276,411 | 3/1942 | Moore | 200/61.34 |
| 2,525,033 | 10/1950 | Hollins | 200/61.34 |
| 2,542,242 | 2/1951 | Fuller | 200/61.34 |
| 2,600,030 | 6/1952 | Stube | 200/61.34 |
| 2,691,704 | 10/1954 | Lincoln et al. | 200/61.34 |
| 3,431,373 | 3/1969 | Fuqua | 200/61.34 |
| 3,914,566 | 10/1975 | Wendling | 200/61.27 |
| 4,423,295 | 12/1983 | Contato | 200/61.27 |
| 4,855,542 | 8/1989 | Furuhashi et al. | 200/61.27 |

Primary Examiner—J. R. Scott
Attorney, Agent, or Firm—Jon C. Winger

[57] ABSTRACT

A motor vehicle turn signal cancelling device operated by the turn signal cancelling pin projecting from the steering wheel of the motor vehicle includes a frame structure to be attached to the steering column of the motor vehicle near the steering wheel. A fixture having first and second oppositely extending arms is pivotally mounted to the frame structure and for movement along the longitudinal direction of the pivot axis. A third arm has its proximal end overlapping the fixture and extends outwardly from the fixture generally perpendicular to the first and second extending arms of the fixture. The fixture is biased upwardly against the proximal end of the third finger. A turn signal actuating lever is pivotally connected to the frame structure adjacent the fixture with its pivotal axis spaced from and parallel with the pivotal axis of the fixture. The distal end of the third arm is interconnected with the proximal end of the turn signal actuating lever so that as the turn signal actuating lever is moved in one direction about its pivotal axis, the fixture is moved in the opposite rotational direction about its pivotal axis. Cancelling pin engagement fingers are pivotally mounted near the distal ends of each of the first and second extending arms of the fixture to engage the cancelling pins. The cancelling pin engagement fingers are biased to pivot against the distal ends of the first and second extending arm to which it is attached.

11 Claims, 4 Drawing Sheets

MOTOR VEHICLE TURN SIGNAL CANCELLING DEVICE

BACKGROUND OF THE INVENTION

The present invention relates to turn signal devices for motor vehicles, and more particularly to a turn signal cancelling device.

Turn signal cancelling devices for motor vehicle turn signals are per se known.

Typically, the turn signal cancelling devices are activated by turn signal cancelling pins which are attached to the motor vehicle steering wheel. The turn signal cancelling pins engage the turn signal cancelling device as the steering wheel is returned from the signalled turned position to a straight ahead position to cancel the turn signal by returning the turn signal activating lever to the neutral position.

It occurs that sometimes a driver of the motor vehicle will hold the turn signal activating lever in the signalled direction of the turn even as the steering wheel returns from the signalled turned position to the straight ahead position or neutral position. This can cause damage to the turn signal cancelling device as the cancelling pins associated with the steering wheel engage the turn signal cancelling device to cancel the turn signal because the driver is preventing the turn signal activating lever, and therefore the turn signal cancelling device, from moving to the neutral position under the force applied thereto by the steering wheel cancelling pins.

SUMMARY OF THE INVENTION

The present invention recognizes the drawbacks of the heretofore known turn signal cancelling device, and provides a straightforward solution.

More particularly, the present invention provides a motor vehicle turn signal cancelling device operated by the turn signal cancelling pins projecting from the steering wheel of the motor vehicle comprising a frame structure to be mounted to the vehicle steering column adjacent the steering wheel; a fixture having oppositely extending first and second arms; means for pivotably mounting the fixture midway between the first and second arms to the frame structure for pivotable movement in both clockwise and counter-clockwise directions to move the distal end of the second arm into the path of movement of the cancelling pin as the cancelling pin moves with the steering sheel when the fixture is pivoted counter-clockwise, and to move the distal end of the first arm into the path of movement of the cancelling pin as the cancelling pin moves with the steering wheel when the fixture is pivoted clockwise; a turn signal actuating lever positioned generally transversely of the first and second arms of the fixture; means for pivotably mounting the turn signal actuating lever between its ends to the frame structure for pivotable movement about a pivot axis parallel to and spaced from the pivot axis of the fixture in both clockwise and counter-clockwise directions; a third arm having its proximal end overlapping the fixture midway between the first and second arms of the fixture and extending outwardly therefrom generally transversely of the first and second arms of the fixture toward the proximal end of the turn signal actuating lever; means for pivotably mounting the third arm at its proximal end to the frame structure for pivotably movement in both clockwise and counter-clockwise directions about a pivot axis coincidental with the pivotable axis of the fixture; clutch means interconnecting the proximal end of the third arm and the fixture providing for pivotable movement of the fixture together with pivotable movement of the third arm about the coincidental pivot axis, and for pivotable movement of the fixture relative to the third arm about the coincidental pivot axis above a threshold torque applied to the first and second arms of the fixture by the cancelling pin; and, means for interconnecting the distal end of the third arm to the adjacent proximal end of the turn signal actuating lever at a location between the pivotable axis of the turn signal actuating lever and the pivotable axis of the third arm such that when the turn signal actuating lever is pivoted in a counter-clockwise direction, the third arm and fixture are caused to pivot in a clockwise direction, and when the turn signal actuating lever is pivoted in a clockwise direction the third arm and fixture are caused to pivot in a counter-clockwise direction.

BRIEF DESCRIPTION OF THE DRAWINGS

A better understanding of the present invention will be had upon reference to the following drawings, wherein like numerals refer to like parts throughout the several views and in which.

DETAILED DESCRIPTION OF THE PREFERRED EMBODIMENT

Figure 1:
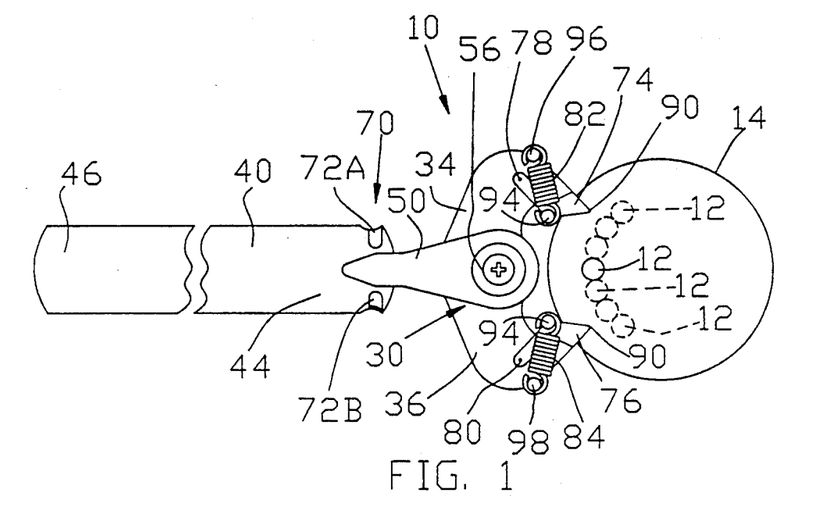
FIG. 1 is a plan view of the turn signal cancelling device of the present invention.
Figure 2:
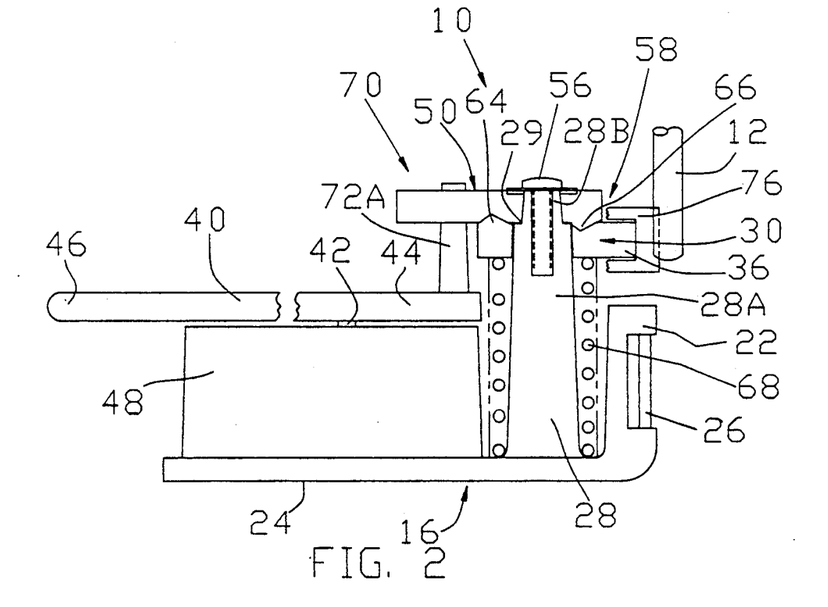
FIG. 2 is a side view, partially in cross-section of the device of FIG. 1.
Figure 3:
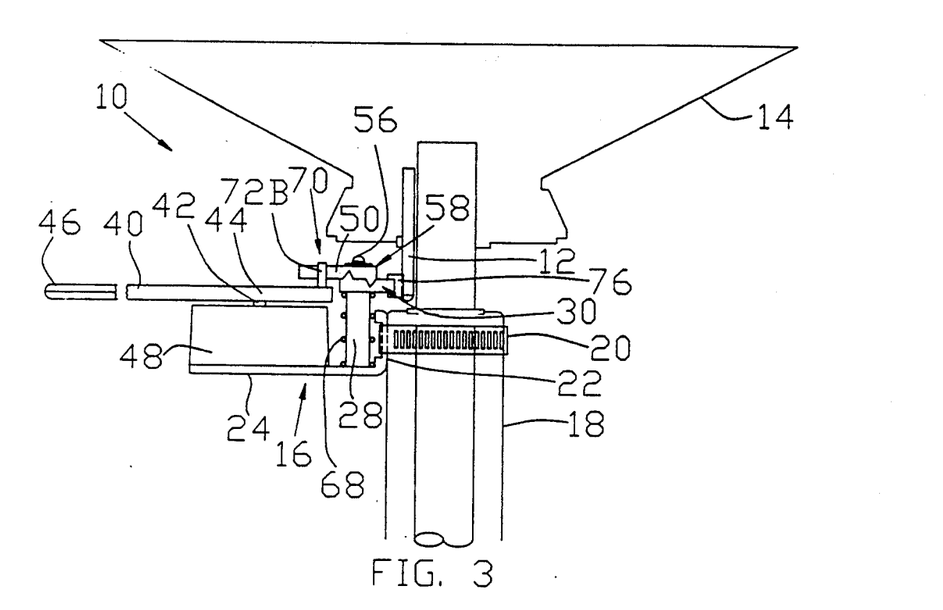
FIG. 3 is a side view, partially in cross-section of the device of FIGS. 1 and 2 affixed to a motor vehicle steering column.

With reference to FIGS. 1, 2 and 3, there is shown a motor vehicle turn signal cancelling device, generally denoted as the numeral 10, operated by turn signal cancelling pins 12 projecting from a steering wheel 14 of a motor vehicle, such as a truck or automobile.

With continued reference to FIGS. 1, 2 and 3, the turn signal cancelling device 10 includes a frame structure 16 to which the other components of the cancelling device 10 are mounted, and which is used to attach the cancelling device 10 to a motor vehicle steering column 18 by clamp means 20. The frame structure 16 is shown as being generally L-shaped in cross-section having a vertical flange 22 and a horizontal flange 24. The vertical flane 22 includes a clamp means engaging bracket 26 for engaging the clamp means 20. For the sake of illustration, the clamp means 20 is shown as a circular clamp which circumscribes the steering column 18 of the motor vehicle. A post 28 is attached to the horizontal flange 24 of the frame structure 16 and extends upwardly therefrom. The post 28 is formed with a circumferential step 29 so that the portion 28A of the post 28 beneath the step 29 has a larger circumference than the portion 28B of the post 28 above the step 29.

With reference to FIGS. 1-5, a fixture 30 includes a central hub 32 and first and second arms 34 and 36, respectively, extending in opposite directions from the hub 32. The fixture is mounted on the lower portion 28A of the post 28 beneath the step 29 and centered on the post 28 with the first arm 34 and second arm 36 extending generally perpendicular to the longitudinal axis of the post 28. The fixture 30 includes means, generally denoted as the numeral 38, for mounting the fixture 30 on the post 28 for pivotable movement in both clockwise and counter-clockwise directions about a pivot axis coincidental with the longitudinal axis of the post 28, and also for movement on the post 28 in the longitudinal direction of the post 28. As shown, fixture mounting means 38 includes a central bore 39 in through the hub 32 having a diameter substantially equal to the diameter of the post portion 28A beneath the step 29 for receiving the lower post portion 28A therethrough with a slip fit.

With reference to FIGS. 1 and 2, a turn signal actuating lever 40 is also pivotably associated with the frame structure 16. The turn signal actuating lever 40 has a pivot mounting 42 between its ends, but much close to its first or proximal end 44 than to its second or distal end 46, with its pivot axis parallel to and spaced from the pivot axis of the fixture 30, i.e. parallel to the longitudinal axis of the post 28. Electrical switching means 48 are affixed to the horizontal flange 24 of the frame structure adjacent to the post 28. The switching means 48 is to be electrically associated with turn signal lamps of the motor vehicle. The turn signal actuating lever 40 is pivotably attached to the electrical switching means 48. When the turn signal actuating lever 40 is pivoted counter-clockwise by the vehicle driver, it closes appropriate switches of the electrical switching means 40 to intermittently illuminate the motor vehicle's left-hand turn signal lamps, and when the turn signal actuating lever 40 is pivoted clockwise by the vehicle driver, it closes appropriate switches of the electrical switching means 40 to intermittently illuminate the motor vehicle's right-hand turn signal lamps.

With reference to FIGS. 1-3, and 6-8, a third arm 50 has its proximal end overlapping the fixture 30 midway between the first arm 34 and second arm 36 of the fixture 30, and extends outwardly therefrom transversely to the first arm 34 and pivotal arm 36 of the fixture 30 toward the proximal end 44 of the turn signal actuating lever 40. The third arm includes means for pivotably mounting it on the post 28 for pivotal movement in both clockwise and counter-clockwise directions about a pivot axis coincidental with the pivotable axis of the fixture 30. Toward this objective, the third arm 50 has a hub 52 at its proximal end, and the hub 52 has a bore 54 therethrough having a diameter substantially equal to the diameter of the post portion 28B above the step 29 for receiving that portion of the upper post portion 28B therethrough with a slip fit. The third arm 50 is, therefore, mounted on the post 28 above the fixture 30 with the underside of the third arm 50 in abutment with the topside of the fixture 30. The third arm 50 is held on the post 28 by, for example, a screw 56 which is threadably received in a coaxial threaded bore in the distal end of the post 28 with the screw head in abutment with the top side of the hub 50 of the third arm 50. The third arm 50 is, therefore, pivotally mounted on the post 28 for pivotal movement about a pivot axis coincidental with the pivotal axis of the fixture 30.

The fixture 30 and third arm 50 are operatively interconnected by clutch means, generally denoted by the numeral 58. The clutch means 58 provides for connecting the third arm 50 to the fixture 30 for pivotal movement together about the coincidental pivot axis defined by the post 28, provides for relative pivotal movement of the fixture 30 to the third arm 50 above a threshold breakaway torque applied to one of the other of the first arm 34 or second arm 36 of the fixture 30 by the cancelling pin 12, and further provides for movement of the fixture 30 downwardly on the lower portion 28A of the post 28 away from the third arm 50 in the longitudinal direction of the post 28 as will hereinafter be discussed. With reference to FIGS. 2-7, the clutch means 58 comprises a first cam profile 60, formed in the central hub 32 of the fixture 30 interfacing with a mating second cam profile 62 formed in the hub 52 of the third arm 50. As shown, the first cam profile 60 comprises four teeth 64 having a triangular profile equally spaced apart from each other around the circumference of the central hub 32, and the second cam profile comprises four teeth 66 having an identical triangular profile equally spaced apart from each other around the circumference of the hub 52 of the third arm 50. The teeth 64 and teeth 66 have, for example, a slope angle of 45 degrees. The teeth 64 of the first cam profile 60 intermesh with the teeth 66 of the second cam profile 64. The clutch means 58 also includes means 68 for resiliently biasing the fixture 30 upwardly toward the distal end of the post 28 and against the third finger 50 forcing the first cam profile 60 of the central hub 32 of the fixture 30 against the second cam profile 62 of the hub 652 of the third arm 50. As shown, the biasing means 68 is a coil spring concentrically located over the post 28 with its bottom end in abutment with the horizontal flange 24 of the clamp means 20 and with its top end in abutment with the underside of the fixture 30.

Figure 10:
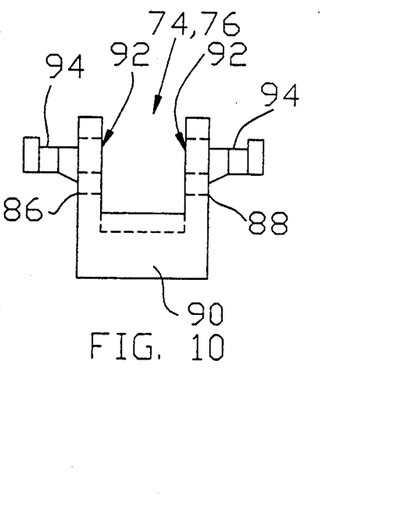
FIG. 10 is an end view of the component of FIG. 9 as seen in the direction of the arrows 10—10 in FIG. 9.

The turn signal actuating lever 40 and the third arm 50 include interconnecting means, generally denoted as the numeral 70, for interconnecting the proximal end 44 of the turn signal actuating lever 40 and the distal end of the third arm 50 at a location between the pivotal mounting 42 or pivotal axis of the turn signal actuating lever 40 and the bore 54 or pivotal axis of the third arm 50. Therefore, as the turn signal actuating lever 40 is pivoted in a counter-clockwise direction for signalling a left-hand vehicle turn, the third arm 50 and the fixture 30 are caused to pivot in a clockwise direction (see FIG. 11); and when the turn signal actuating lever 40 is pivoted in a clockwise direction for signally a right-hand vehicle turn, the third arm 50 and fixture 30 are caused to pivot in a counter-clockwise direction (see FIG. 10). As shown, the interconnecting means 70 includes a pair of third arm engagement fingers 72 located at the proximal end 44 of the turn signal actuating lever 40 to either longitudinal side of the third arm 50 caging the distal end of the third arm 50 therebetween. When the turn signal actuating lever 40 is pivoted in the counter-clockwise direction, one of the fingers 72A pushes the against the adjacent longitudinal side of the third arm 50 pivoting the third arm 50 and fixture 30 in the clockwise direction, and when the turn signal actuating lever 40 is pivoted in the clockwise direction, the other one of the fingers 72B pushes against the adjacent longitudinal side of the third arm 50 pivoting the third arm 50 and fixture 30 in the counter-clockwise direction.

With reference to FIGS. 1, 2, 3, 9, and 10, the cancelling device 10 further includes a first cancelling pin engagement finger 74 and a second cancelling pin engagement finger 76. The first cancelling pin engagement finger 74 is pivotally mounted at its proximal end to the distal end of the first arm 34 of the fixture 30 and project generally transversely outwardly from the first arm 34. The second cancelling pin engagement finger 76 is pivotally mounted at its proximal end to the distal end of the second arm 36 of the fixture 30 and projects generally transversely outwardly from the second arm 36. The proximal end of the first cancelling pin engagement finger 74 is pivotally connected to the first arm 34 by a pivot pin 78 parallel to the post 28 defining the pivot axis of the fixture 30 for pivotal movement in both clockwise and counter-clockwise directions about the pivot axis or pin 78 generally in the plane of the fixture 30. The proximal end of the second cancelling pin engagement finger 76 is pivotally connected to the second arm 36 by a pivot pin 80 parallel to the post 28 defining the pivot axis of the fixture 30 for pivotal movement in both clockwise and counter-clockwise directions about the pivot axis or pin 80 generally in the plane of the fixture 30. The first cancelling pin engagement finger 74 is resiliently biased to pivot in a counter-clockwise direction by a spring 82 which is connected at one of its ends to the distal end of the first arm 34 and at its other end to the first cancelling pin engagement finger 74 between the proximal and distal ends of the first cancelling pin engagement finger 74. The second cancelling pin engagement finger 76 is resiliently biased to pivot in a clockwise direction by a spring 84 which is connected at one of its ends to the distal end of the second arm 36 and at its other end to the second cancelling pin engagement finger 76 between the proximal and distal ends of the second cancelling engagement finger 76.

Figure 9:
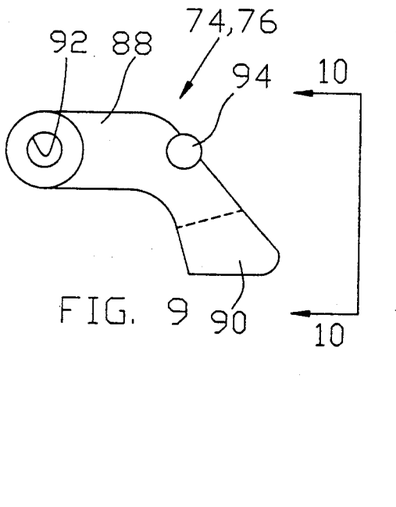
FIG. 9 is a top view of still another component of the device of FIGS. 1 and 2.

As can be seen best in FIG. 9, the first and second cancelling pin engagement fingers 74 and 76 are identical to each other. The cancelling pin engagement finger 74, 76 includes two parallel spaced apart flanges 86 and 88 and an end or tip 90 interconnecting the flanges 86, 88 at the distal end of the cancelling pin engagement finger, 74, 76. The flanges 86, 88 include aligned apertures 92 at their ends opposite the tip 90 for receiving the pivot pins 78, 80 for pivotally mounting the cancelling pin engagement fingers 74, 76, respectively, to the first and second arms 34, 36 of the fixture 30 as discussed above. The distal end of the first arm 34 and second arm 36 is received in the space between the flanges 86, 88. The pivotal movement of the first and second cancelling pin engagement fingers 74, 76 is limited in both clockwise and counter-clockwise directions by the tip 90 which contacts the lateral sides of the first and second arms 34, 36 at the opposite extremes of pivotal motion of the cancelling pin engagement fingers 74, 76. The cancelling pin engagement finger 74, 76 also includes two spring-retaining posts 94 extending outwardly from each flange 86 and 88 of the cancelling pin engagement finger 74, 76 at a location between the proximal and distal ends of the cancelling engagement finger 74, 76 for attaching one end of the springs 82 and 84 to the cancelling engagement finger 74, 76, respectively. Thus, the cancelling pin engagement finger is symmetrical so that it is used as both the first finger 74 and second finger 76.

Figure 4:
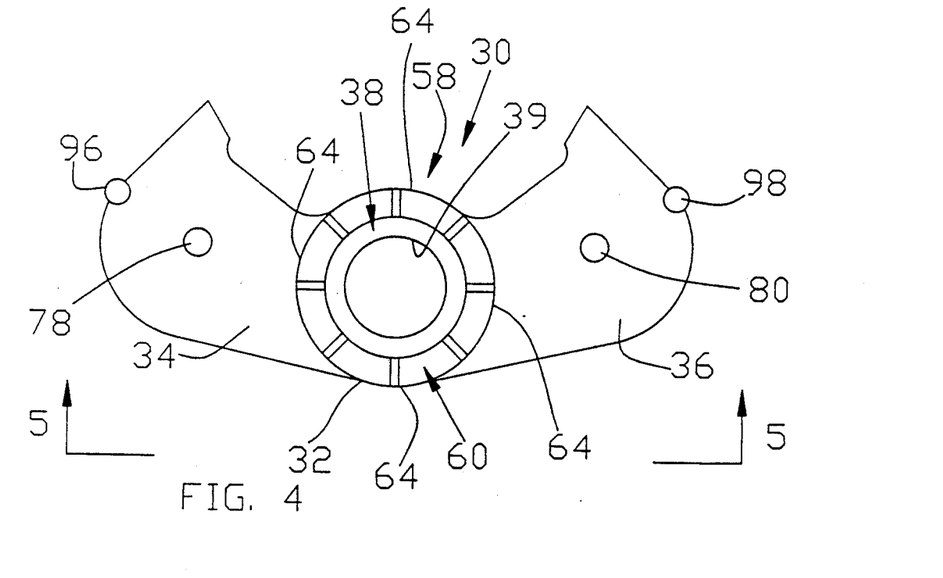
FIG. 4 is a plan view of one component of the device of FIGS. 1 and 2.
Figure 5:
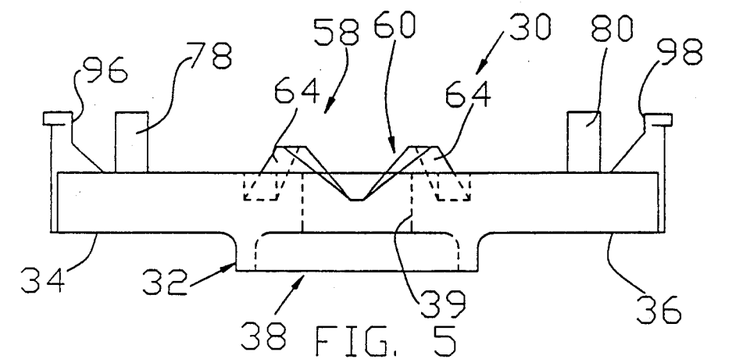
FIG. 5 is a side view of the component in the direction of arrows 5—5 in FIG. 4.
Figure 6:
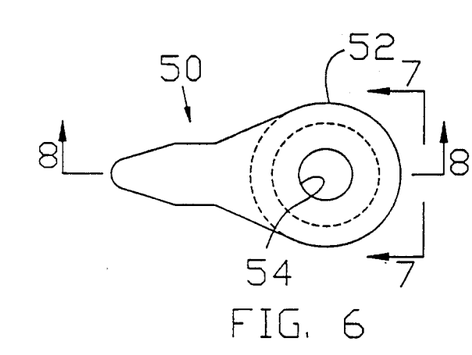
FIG. 6 is a plan view of another component of the device of FIGS. 1 and 2.
Figure 7:
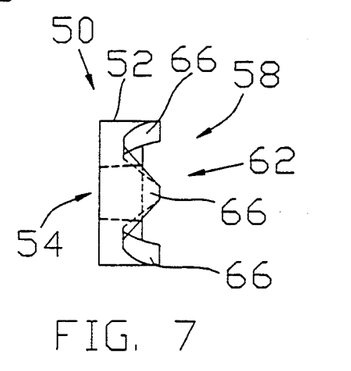
FIG. 7 is a cross-sectional side view of the component of FIG. 6 as seen in the direction of arrows 7—7 in FIG. 6.
Figure 8:
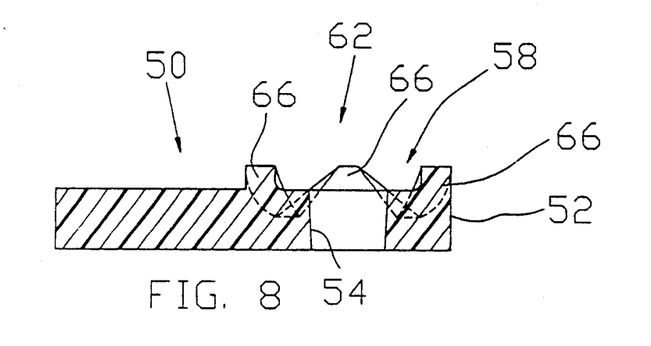
FIG. 8 is a cross-sectional side view of the component of FIG. 6 as seen in the direction of arrows 8—8 in FIG. 6.

With reference to FIGS. 1, 4 and 5, the fixture 30 includes a first spring retaining post 96 for attaching the opposite end of the spring 82 to distal end of the first arm 34 and a second spring retaining post 98 for attaching the opposite end of the spring 84 to the distal end of the second arm 36. The first spring retaining post projects perpendicularly outwardly from the first arm 34 near the distal end of the first arm 34 spaced from the pivot pin 78 pivotally attaching the first cancelling pin engagement finger 74 to the first arm 34. The second spring retaining post 98 projects perpendicularly outwardly from the second arm 36 near the distal end of the second arm 36 spaced from the pivot pin 80 pivotally attaching the second cancelling pin engagement finger 76 to the second arm 36.

The operation of the cancelling device 10 will now be discussed with reference to FIGS. 1, 11, and 12. FIG. 1 illustrates the cancelling device 10 in the neutral position wherein neither a right turn nor left turn is being signaled. In the neutral position, the cancelling pin 12 on the motor vehicle steering wheel 14 misses, i.e. bypasses first and second cancelling pin engagement fingers 74 and 76 as the steering wheel is turned. The movement of the cancelling pin 12 is indicated by the cancelling pin 12 illustrated in phantom.

Figure 11:
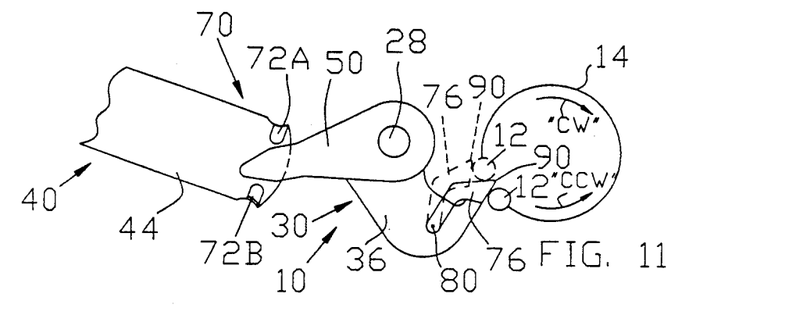
FIG. 11 is a top view of the device of FIGS. 1 and 2 showing it in a right-hand turn position; and, FIG. 12 is a top view of the device of FIGS. 1 and 2 showing it in a left-hand turn position.

FIG. 11 illustrates the cancelling device 10 in a right-hand turn indicating position when the vehicle driver moves the turn signal actuating lever 40 from the neutral or straight ahead position clockwise to signal a right-hand turn. As the turn signal actuating lever 40 is pivoted clockwise about its pivot mounting 42 by the vehicle driver, the third arm engagement finger 72A is forced against the adjacent longitudinal side of the third arm 50 pivoting the third arm 50 and, therefore, the fixture 30 about the pivot axis defined by the post 28 in a counter-clockwise direction moving the first arm 34 and its attached first cancelling pin engagement finger 74 away from the circular path of the cancelling pin 12 and moving the second arm 36 and its attached second cancelling pin engagement finger 76 toward the circular path of the cancelling pin 12. As the cancelling pin 12 moves clockwise with the vehicle steering wheel 14 to turn the vehicle in a right-hand turn (indicated by the arrow "CW"), the cancelling pin 12 contacts one side of the distal end of the second cancelling pin engagement finger 76 and causes it to pivot against the bias of the spring 84 counter-clockwise about its pivot pin 80 (as indicated by the phantom lines) allowing the cancelling pin 12 to freely bypass the second cancelling pin engagement finger 76 so that the cancelling device 10 will not interfere with the turning of the steering wheel 14 and will not cancel the turn signal. The biasing spring 84 returns the second cancelling pin engagement finger 76 back in a clockwise direction about its pivot pin 80 and into abutment with the distal end of the second arm 36 as the cancelling pin 12 passes the second cancelling pin engagement finger 76. Now under proper operating driving conditions, the vehicle driver releases his hold on the turn signal actuating lever 40, and as the vehicle steering wheel 14 is returned counter-clockwise back to the neutral or straight ahead position (indicated by the arrow "CCW") the cancelling pin 12 contacts the other side of the distal end of the second cancelling pin engagement finger 76 which is now in abutment with the distal end of the second finger 36 due to the bias force of the spring 84 forcing the fixture 30 and, therefore, the third arm 50 to pivot about the pivot axis defined by the post 28 in a clockwise direction back to the neutral position shown in FIG. 1 cancelling the turn signal. As the third arm 50 pivots in the clockwise direction back to the neutral position, the one longitudinal side of the third arm 50 is forced back against the third arm engagement finger 72A causing the turn signal actuating lever 40 to pivot counter-clockwise about its pivot mounting 42 back to the neutral or straight ahead position. However, it sometimes occurs that the vehicle driver does not release hold of the turn signal actuating lever 40 as the vehicle steering wheel 14 is returned counter-clockwise back to the neutral or straight ahead position after a right-hand turn is completed. In this event, when the vehicle steering wheel 14 is returned counter-clockwise back to the neutral or straight ahead position, the cancelling pin 12 contacts the other side of the distal end of the second cancelling pin engagement finger 76, which is now in abutment with the distal end of the second arm 36 due to the bias force of the spring 84, however, the fixture 30 and, therefore, the third arm 50 cannot pivot about the pivot axis defined by the post 28 as it could under proper operating driving conditions because the driver is holding the turn signal actuating lever 40. When this happens, the cancelling pin 12 moving counter-clockwise with the steering wheel 14 continues to apply a force against the second cancelling pin engagement finger 76 and, therefore, the second arm 36 of the fixture 30 being held against rotation about the post 28 until the force generated by the cancelling pin 12 exceeds the threshold torque of clutch means 58. As the threshold torque of the clutch means 58 is exceeded, the clutch means 58 slips allowing relative pivotal movement of the fixture 30 about the post 28 in a clockwise direction relative to the still stationary third arm 50 being held against pivotal movement about the post 28 by the turn signal actuating lever 40. As the fixture 30 pivots about the post 28, the first cam profile 60 on the hub 32 of the fixture 30 rides over the second cam profile 62 on the hub 52 of the third arm 50. As the first cam profile 60 rides over the second cam profile 62, the teeth 64 of the first cam profile 60 are moved out of meshing engagement with the teeth 66 of the second cam profile 62 and slides on the edges of the teeth 66 of the second cam profile 62 thereby forcing the fixture 30 downwardly along the longitudinal axis of the post 28 against the biasing force of the spring 68 moving the fixture 30 away from the third arm 50 until the second cancelling pin engagement finger 76 is displaced beneath the distal end of the depending cancelling pin 12 allowing the cancelling pin 12 to move over the top side of and pass the second cancelling pin engagement finger 76, thereby preventing potential damage to the second cancelling pin engagement finger 76 and fixture 30.

Figure 12:
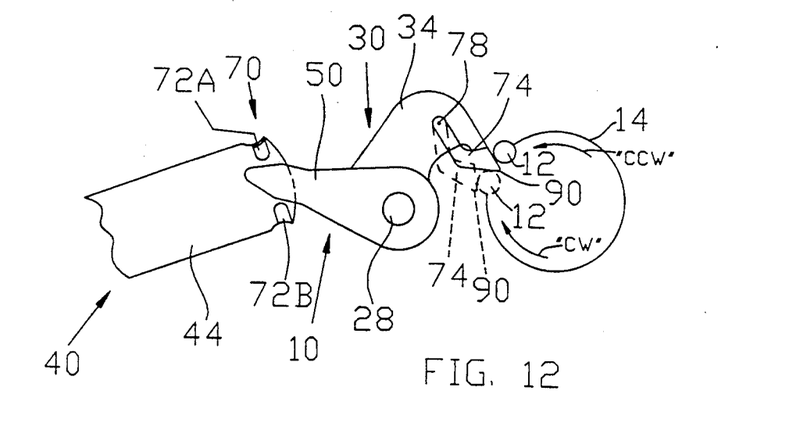

FIG. 12 illustrates the cancelling device 10 in a left-hand turn position when the vehicle driver moves the turn signal actuating lever 40 from the neutral position or straight ahead position counter-clockwise to signal a left-hand turn. As the turn signal actuating lever 40 pivots counter-clockwise about its pivot mounting 42 the third arm engagement finger 72B is forced against the adjacent longitudinal side of the third arm 50 pivoting the third arm 50 and, therefore, the fixture 30 about the pivot axis defined by the post 28 in a clockwise direction moving the first arm 34 and its attached first cancelling pin engagement finger 74 toward the circular path of the cancelling pin 12 and moving the second arm 36 and its attached second cancelling pin engagement finger 76 away from the circular path of the cancelling pin 12. As the cancelling pin 12 moves counter-clockwise with the vehicle steering wheel 14 to turn the vehicle in a left-hand turn (indicated by the arrow "CCW"), the cancelling pin 12 contacts one side of the distal end of the first cancelling pin finger 74 and causes it to pivot against the bias of the spring 82 clockwise about its pivot pin 78 (as indicated by the phantom lines) allowing the cancelling pin 12 to freely bypass the first cancelling pin engagement finger 74 so that the cancelling device 10 will not interfere with the turning of the steering wheel 14 and will not cancel the turn signal. The biasing spring 82 returns the first cancelling pin engagement finger 74 back in a counter-clockwise direction about its pivot pin 78 and into abutment with the distal end of the first arm 34 as the cancelling pin 12 passes the first cancelling pin engagement finger 74. Now under proper operating driving conditions, the vehicle driver releases his hold on the turn signal actuating lever 40, and as the vehicle steering wheel 14 is returned clockwise back to the neutral or straight ahead position (indicated by the arrow "CW"), the cancelling pin 12 contacts the other side of the distal end of the first cancelling pin engagement finger 74 which is now in abutment with the distal end of the first finger 34 due to the bias force of the spring 82 forcing the fixture 30 and, therefore, the third arm 50 to pivot about the pivot axis defined by the post 28 in a counter-clockwise direction back to the neutral position shown in FIG. 1 cancelling the turn signal. As the third arm 50 pivots in the counter-clockwise direction back to the neutral position, the one longitudinal side of the third arm 50 is forced back against the third arm engagement finger 72B causing the turn signal actuating lever 40 to pivot clockwise about its pivot mounting 42 back to the neutral or straight ahead position. However, it sometimes occurs that the vehicle driver does not release hold of the turn signal actuating lever 40 as the vehicle steering wheel 14 is returned clockwise back to the neutral or straight ahead position after a left-hand turn is completed. In this event, when the vehicle steering wheel 14 is returned clockwise back to the neutral or straight ahead position, the cancelling pin 12 contacts the other side of the distal end of the first cancelling pin engagement finger 74, which is now in abutment with the distal end of the first arm 34 due to the bias force of the spring 82, however, the fixture 30 and, therefore, the third arm 50 cannot pivot about the pivot axis defined by the post 28 as it could under proper operating driving conditions because the driver is holding the turn signal actuating lever 40. When this happens, the cancelling pin 12 moving clockwise with the turning wheel 14 continues to apply a force against the first cancelling pin engagement finger 74 and, therefore, the first arm 34 of the fixture 30 being held against rotation about the post 28 until the force generated by the cancelling pin 12 exceeds the threshold torque of clutch means 58. As the threshold torque of the clutch means 58 is exceeded, the clutch means 58 slips allowing relative pivotal movement of the fixture 30 about the post 28 in a counter-clockwise direction relative to the still-stationary third arm 50 being held against pivotal movement about the post 28 by the turn signal actuating lever 40. As the fixture 30 pivots about the post 28, the first cam profile 60 on the hub 32 of the fixture 30 rides over the second cam profile 62 on the hub 52 of the third arm 50. As the first cam profile 60 rides over the second cam profile 62, the teeth 64 of the first cam profile 60 are moved out of meshing engagement with the teeth 66 of the second cam profile 62 and slides on the edges of the teeth 66 of the second cam profile 62, thereby forcing the fixture 30 downwardly along the longitudinal axis of the post 28 against the biasing force of the spring 68 moving the fixture 30 away from the third arm 50 until the first cancelling pin engagement finger 74 is displaced beneath the distal end of the depending cancelling pin 12 allowing the cancelling pin 12 to move over the top side of and pass the first cancelling pin engagement finger 74, thereby preventing potential damage to the first cancelling pin engagement finger 74 and fixture 30.

The foregoing detailed description is primarily for clearness of understanding and no unnecessary limitations are to be understood therefrom for modifications will become obvious to those skilled in the art and can be made without departing from the spirit of the invention and scope of the appended claims.

What is claimed is:

1. A motor vehicle turn signal device operated by a turn signal cancelling pin depending from the steering wheel of the motor vehicle comprising:

a frame structure mounted to the vehicle steering column adjacent the steering wheel;

a fixture having oppositely extending first and second arms;

means for pivotally mounting the fixture midway between the first and second arms to the frame structure for pivotal movement in both clockwise and counter-clockwise directions to move the distal end of the second arm into the path of movement of the cancelling pin as the cancelling pin moves with the steering wheel when the fixture is pivoted counter-clockwise, and to move the distal end of the first arm into the path of movement of the cancelling pin as the cancelling pin moves with the steering wheel when the fixture is pivoted clockwise;

a turn signal actuating lever positioned generally transversely of the first and second arms of the fixture;

means for pivotally mounting the turn signal actuating lever between its ends to the frame structure for pivotal movement about a pivot axis parallel to and spaced from the pivot axis of the fixture in both clockwise and counter-clockwise directions;

a third arm having its proximal end overlapping the fixture midway between the first and second arms of the fixture and extending outwardly therefrom generally transversely of the first and second arms of the fixture toward the proximal end of the turn signal actuating lever;

means for pivotally mounting the third arm at its proximal end to the frame structure for pivotal movement in both clockwise and counter-clockwise directions about a pivot axis coincidental with the pivotal axis of the fixture;

clutch means interconnecting the proximal end of the third arm and the fixture providing for pivotal movement of the fixture together with pivotal movement of the third arm about the coincidental pivot axis, and for pivotal movement of the fixture relative to the third arm about the coincidental pivot axis above a threshold torque applied to the first and second arms of the fixture by the cancelling pin; and, means for interconnecting the distal end of the third arm to the adjacent proximal end of the turn signal actuating lever at a location between the pivotal axis of the turn signal actuating lever and the pivotal axis of the third arm such that when the turn signal actuating lever is pivoted in a counter-clockwise direction, the third arm and fixture are caused to pivot in a clockwise direction, and when the turn signal actuating lever is pivoted in a clockwise direction, the third arm and fixture are caused to pivot in a counter-clockwise direction.

2. The turn signal device of claim 1, wherein the clutch means further comprises interacting profile means associated with the third arm and fixture for moving the fixture away from the third arm in the longitudinal direction of the coincidental pivot axis above the threshold torque applied to the first and second arms of the fixture by the cancelling pin.

3. The turn signal device of claim 2, wherein the clutch means further comprises biasing means for forcing the interacting profile means of the third arm and fixture together.

4. The turn signal device of claim 3, wherein the biasing means forcing the interacting profile means together, forces the fixture toward the third arm in the longitudinal direction of the coincidental pivot axis of the third arm and fixture.

5. The turn signal device of claim 1, further comprising:

a first cancelling pin engagement finger on the distal end of the first arm of the fixture;

means for pivotally mounting the first cancelling pin engagement finger to the first arm of the fixture for pivotal movement in both clockwise and counter-clockwise directions relative to the first arm;

a second cancelling pin engagement finger on the distal end of the second arm of the fixture;

means for pivotally mounting the second cancelling pin engagement finger to the second arm of the fixture for pivotal movement in both clockwise and counter-clockwise directions relative to the second arm.

6. The turn signal device of claim 5, further comprising:

first biasing means for biasing the first cancelling pin engagement finger in a counter-clockwise direction about the pivotal mounting means of the first cancelling pin engagement finger to the first arm; and, second biasing means for biasing the second cancelling pin engagement finger in a clockwise direction about the pivotal mounting means of the second cancelling pin engagement finger to the second arm.

7. The turn signal device of claim 5, wherein the pivotal axis of the first cancelling pin engagement finger is parallel to the pivot axis of the second cancelling pin engagement finger.

8. The turn signal device of claim 7, wherein the pivotal axes of the first and second cancelling pin engagement fingers are parallel to the pivotal axis of the fixture.

9. The turn signal device of claim 1, wherein:

a. the means for pivotally mounting the fixture to the frame structure comprises:

a post extending from the frame structure; and, means defining a bore through the fixture midway between the first and second arms receiving the post with a slip fit; and, b. the means for pivotally mounting the third arm to the frame structure comprises:
the post extending from the frame structure; and,
means defining a bore through the third arm receiving the post with a slip fit.

10. The turn signal device of claim 9, the clutch means comprising:
first profile means structurally associated with the fixture concentrically disposed with the bore through the fixture; and,
second profile means mating with the first profile means structurally associated with the third arm concentrally disposed with the bore through the third arm;
whereby, when the first and second profile means move out of mutual mating relationship, the fixture is forced away from the third arm in the direction along the longitudinal axis of the post.

11. The turn signal device of claim 10, wherein the clutch means further comprising biasing means forcing the fixture toward the third arm in the direction of the longitudinal axis of the past forcing the first profile means against the second profile means.

* * * * *